United States Patent Office 3,743,658
Patented July 3, 1973

3,743,658
PROCESS FOR PREPARING α-PYRONES
Johann F. Klebe, Schenectady, N.Y., assignor to
General Electric Company
No Drawing. Filed Feb. 24, 1969, Ser. No. 806,775
Int. Cl. C07d 7/16
U.S. Cl. 260—343.5     5 Claims

ABSTRACT OF THE DISCLOSURE

α-Pyrones can be prepared by reacting a lower fatty acid halide with a Lewis acid catalyst at elevated temperatures in the substantial absence of a solvent. The α-pyrones thus produced are useful for biological purposes and as intermediates for making polymeric compositions.

---

This invention is concerned with a certain class of α-pyrones and methods for preparing the same. More particularly, the invention relates to α-pyrones of the general formula

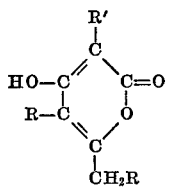

which are prepared by treating a fatty acid halide of the formula

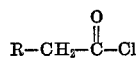

in the substantial absence of a solvent for the acid halide with a Lewis acid catalyst at an elevated temperature, preferably at least at the fusion temperature of the acid halide, and thereafter isolating the formed α-pyrone, where each R is the same and is a member selected from the class consisting of hydrogen and alkyl groups of from 1 to 3 carbon atoms, with the proviso that R' is the same as R when R is alkyl, and R' is the

radical when R is hydrogen.

Among the fatty acid halides which may be employed in the practice of the present invention may be mentioned acetyl chloride, propionyl chloride, butyryl chloride, isobutyryl chloride, pentanoyl chloride, etc.

Included among the Lewis acid catalysts which may be employed for making the aforementioned α-pyrones are, for instance, aluminum trichloride, aluminum tribromide, ferric chloride, stannic chloride, etc. Although the concentration of Lewis acid catalyst is not critical, it is generally employed in an amount, by weight equal to from 1 to 4 parts of the catalyst per part of the fatty acid chloride. Since the reaction of the fatty acid chloride with the catalyst takes place at elevated temperatures and some of the Lewis acid catalysts may sublime, it is often desirable to complex the Lewis acid catalyst with another composition which will enable the catalyst to retain its activity and yet be available in the reaction zone. For instance, when using aluminum chloride, one can heat a mixture of the aluminum trichloride and sodium chloride to form a low melting eutectic which in turn can be used for reaction purposes. It should, however, be understood that the actual catalyst for formation of the α-pyrones is a Lewis acid catalyst and that any complexing agent employed is merely for convenience purposes.

The temperature at which the reaction is carried out may also be varied widely and can be within the range of from that temperature at which reaction takes place to below the decomposition point of the organic reactant or organic reaction product. Generally, I have found that temperatures of the order of 75 to 200° C. are adequate for converting the fatty acid chloride to the α-pyrone.

In carrying out the reaction, it is important that little if any solvent be employed in the reaction mixture and preferably the reaction be carried out by heating the fatty acid chloride and the catalyst to a temperature sufficient to effect melting of the fatty acid chloride for reaction with the catalyst. It has been found in the past (see "Friedel-Crafts and Related Compounds" by G. Olah, vol. III, Part 2, published by Interscience Publishers, New York, N.Y., 1964) that when a solvent is employed for this particular reaction, for instance, in the reaction of aluminum chloride with acetyl chloride, one obtains acetyl acetone, in contrast to the unexpected α-pyrones obtained in accordance with the applicant's invention.

In order that those skilled in the art may better understand how the present invention may be practiced the following examples are given by way of illustration and not by way of limitation.

EXAMPLE 1

A mixture of 41 grams anhydrous aluminum trichloride and 11 grams sodium chloride was melted under anhydrous conditions and then placed in a reaction vessel immersed in an oil bath maintained at 100° C. About 30 grams acetyl chloride was then added rapidly to the stirred salt melt. HCl gas was rapidly evolved and the refluxing mixture was stirred continuously for a period of about 1½ hours until the acetyl chloride had been reacted and a viscous mass was formed. The product this obtained was decomposed by pouring onto crushed ice to give a clear solution, which when allowed to stand for about 18 hours, resulted in the precipitation of light crystals, which were removed by filtration. The filtrate was extracted twice with 50 cc. portions of diethyl ether and the combined ether extract was shaken with 1 N NaOH solution, separated from the aqueous phase and the latter acidified with concentrated HCl, whereupon another portion of the crystal product was obtained. The combined portions of the crystals were recrystallized from an equal volume mixture of benzene and hexane to give a crystalline product M.P. 109–111° C. Analysis of this product showed it to be 3-acetyl-4-hydroxy-6-methyl-2H-pyran-2-one as evidenced by the analytical results which were as follows:

|  | Found | Calculated |
|---|---|---|
| Percent C | 56.85 | 57.1 |
| Percent H | 4.73 | 4.8 |
| Molecular wt | 168 | 168 |

The nuclear magnetic resonance spectrum in DCCl₃ further identified the compound as being the one recited above.

EXAMPLE 2

To a melt containing 41 grams of aluminum trichloride and 11 grams of sodium chloride was added with stirring at 100° C. 28 grams of propionyl chloride. Gaseous HCl evolved immediately and the mixture was stirred and allowed to reflux at a temperature of 100–110° C. for about 1 hour. A viscous product which was thus obtained was poured onto ice and a nearly homogeneous solution was obtained which was extracted with diethyl ether. The ether extract was shaken with 30 cc. of 1 N NaOH solution and the alkaline solution was then acidified with concentrated hydrochloric acid. A brown solid separated which was washed with water, dried and was found to sublime at 120–130° C./0.1 mm. The washed crystalline product had a M.P. 152–154° C. This composition was identified as 3,5-dimethyl-4-hydroxy-6-ethyl-2H-pyran-2-one as evidenced by the analysis for the elements of the composition which were as follows:

|  | Found | Calculated |
|---|---|---|
| Percent C | 63.86 | 64.25 |
| Percent H | 7.19 | 7.19 |
| Molecular wt | 168 | 168 |

The nuclear magnetic resonance spectrum in $DCCl_3$ further identified the compound as being the one specified above.

It will of course be apparent to those skilled in the art that other conditions such as temperature, proportions of ingredients, other types of Lewis acid catalysts, and other fatty acid halides may be employed without departing from the scope of the invention. Many of the conditions which can be employed together with different catalysts and fatty acid halides have been mentioned previously.

In addition to each of the α-pyrones of Formula I being useful as analgesics, antipyretics, and exhibiting anti-inflammatory and sedative effects, each of these α-pyrones can be employed as coreactants with bismaleimides as shown in U.S. Pats. 2,890,207 and 3,074,915.

For example, compositions defined by Formula I can be reacted in the manner described in U.S. 2,890,207 issued June 9, 1959 with an N,N'-bis-maleimide of the general formula (II) 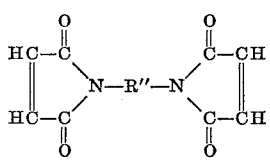

to give by means of a Diels-Alder reaction, compositions of the formula (III) 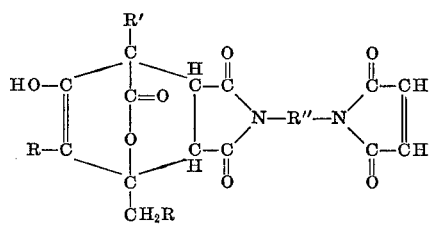

where R and R' have the meanings given above and R" is a divalent hydrocarbon group such as alkylene, arylene, aralkylene, etc. The composition corresponding to Formula III can then be heated at 150° C. to evolve carbon dioxide to give a composition of the Formula IV.

(IV) 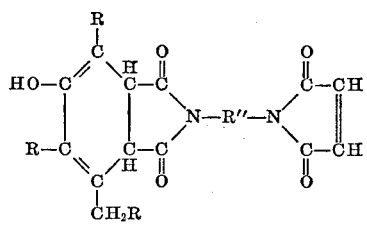

This composition of Formula IV can then be polymerized and molded at temperatures of from 150 to 250° C. into a polymer which is believed to have the structure (V) 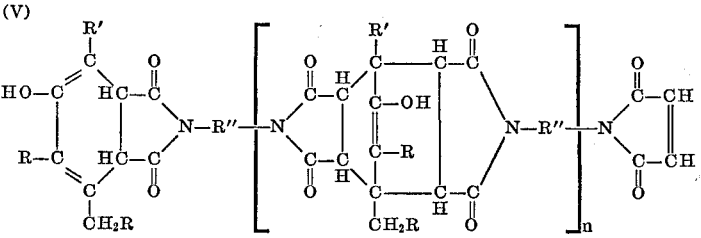

where R, R', and R" have the meanings given above and $n$ represents an integer sufficiently large to give a high molecular weight product. These polymers are useful for molding and insulation purposes and particularly for insulation for electrical conductors where high temperature resistance is desirable.

What I claim as new and desire to secure by Letters Patent of the United States is:

1. The process for making α-pyrones of the formula

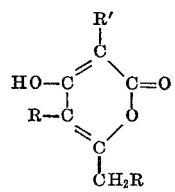

which comprises heating a fatty acid halide of the formula

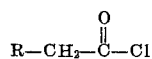

in the substantial absence of a solvent for the acid halide in the presence of a Lewis acid catalyst and thereafter isolating the formed α-pyrone, where each R is the same and is a member selected from the class consisting of hydrogen and alkyl radicals of from 1 to 3 carbon atoms, and R' is the same as R when R is alkyl, and R' is the

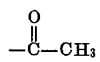

radical when R is hydrogen.

2. The process as in claim 1 wherein the fatty acid halide is acetyl chloride.

3. The process as in claim 1 wherein the fatty acid halide is propionyl chloride.

4. The process as in claim 1 wherein the reaction is carried out at a temperature of from 100 to 200° C.

5. The process as in claim 1 wherein the Lewis acid catalyst is aluminum trichloride.

References Cited

Olah, Friedel-Crafts and Related Reactions, vol. III, Part 2, Interscience Publishers, New York, 1964 (pp. 1093–1095 relied on).

ALEX MAZEL, Primary Examiner

A. M. T. TIGHE, Assistant Examiner

U.S. Cl. X.R.

424—279; 260—88.3 R, 326 A, 326 N, 326 R